(12) United States Patent
Raguin et al.

(10) Patent No.: US 6,813,080 B2
(45) Date of Patent: Nov. 2, 2004

(54) METAL-FREE GRATINGS FOR WAVELENGTH-MULTIPLEXED OPTICAL COMMUNICATIONS

(75) Inventors: Daniel H. Raguin, Acton, MA (US); John R. Marciante, Webster, NY (US)

(73) Assignee: Corning Incorporated, Corning, NY (US)

( * ) Notice: Subject to any disclaimer, the term of this patent is extended or adjusted under 35 U.S.C. 154(b) by 51 days.

(21) Appl. No.: 10/356,424

(22) Filed: Jan. 31, 2003

(65) Prior Publication Data

US 2004/0150885 A1 Aug. 5, 2004

(51) Int. Cl.$^7$ ................................................ G02B 5/18
(52) U.S. Cl. ...................... 359/572; 359/576; 359/569; 359/566
(58) Field of Search .................. 359/572, 569, 359/566, 576, 571

(56) References Cited

U.S. PATENT DOCUMENTS

| 5,966,483 | A | 10/1999 | Chowdhury |
|---|---|---|---|
| 6,449,096 | B1 | 9/2002 | Fabiny et al. |
| 6,480,332 | B1 | 11/2002 | Nakai |
| 2003/0142405 | A1 * | 7/2003 | Hoose et al. ................ 359/567 |

* cited by examiner

Primary Examiner—Fayez Assaf
(74) Attorney, Agent, or Firm—Walter M Douglas (57) ABSTRACT

The invention is directed to metal-free grating for use in wavelength optical communications, and in particular to metal-free, reflective immersed diffraction gratings. The gratings of the invention area made of at least a first material 1 of refractive index $n_1$ and a second material of refractive index $n_2$. Materials 1 and 2 must obey the Expressions: (I) $n_1 > n_2$, (II) $n_1 > \lambda/2L > n_2$ for single diffracted order at Littrow, and (III) $n_2/n_1 < \text{Sin}|\theta_j| < 1$; wherein $\lambda$ is the wavelength of the light incident on the grating, $\theta_j$ represents any and all propagation angles of incident and diffracted light, and L is the grating period. The grating profile is located at the interface of material 1 and to material 2. In one embodiment, the grating profile is made from additional material 3 and 4 of refractive index $n_3$ and $n_4$, respectively, and is placed between materials 1 and 2. In another embodiment the grating is made from silicon.

14 Claims, 7 Drawing Sheets

METAL-FREE GRATINGS FOR WAVELENGTH-MULTIPLEXED OPTICAL COMMUNICATIONS

FIELD OF THE INVENTION

The invention relates to the field of optical communications and the routing of different wavelength signals. In particular, the invention relates to metal-free reflective diffraction gratings that are used in optical communications for dispersing light by wavelength.

BACKGROUND OF THE INVENTION

Optical communication systems include, among others, elements such as multiplexers, devices that route different wavelength signals from individual pathways into a common pathway, and demultiplexers, devices that route the different wavelength signals from a common pathway back into individual pathways. Often, the only difference between these two devices is the directions of the light traveling through them.

The multiplexer/demultiplexer designs that have gained widest acceptance are based on spectrographs containing either phased arrays or diffraction gratings. Within these two types of devices, the two mechanisms that are used for routing the optical signals between the common and the individual pathways are dispersion and focusing. Dispersion angularly distinguishes between the different wavelength signals. Focusing converts the angularly distinguished signals into spatially distinguished signals. While phased arrays work well when different wavelengths are conveyed among a small number of optical channels (pathways or waveguides), they become unwieldy when a large number of channels are involved. Diffraction gratings are better suited for systems having a large number of channels. It is the ability of diffraction gratings to map wavelengths into a propagation angle that makes them suitable for use in add-drop filters, multiplexers and demultiplexers, and other wavelength configurable devices.

Typical reflective diffraction gratings involve the use of metal-coated surfaces to provide the reflectivity. Metals commonly used in such gratings are, among others, gold, silver, aluminum and nickel. However, using a metal to provide the reflective properties of the grating results in a reduction in the maximum attainable diffraction efficiency due to the absorption of light by the metallic surface. Typical maximum attainable efficiencies are limited to 90–95% of the theoretical maximum and depend on the specific metal (e.g., Ag, Au, etc.) that is used and the wavelength of the incident light. Another problem with metal-coated diffraction gratings is that the absorbed light is converted into heat which can create problems, including catastrophic failure of the device, when the grating is used in applications that require high optical power. Lastly, in addition to the heat problem, the manufacturing of a grating with a metalized surface is a multi-step process that involves additional equipment, materials, time, and cost.

Figure 1:
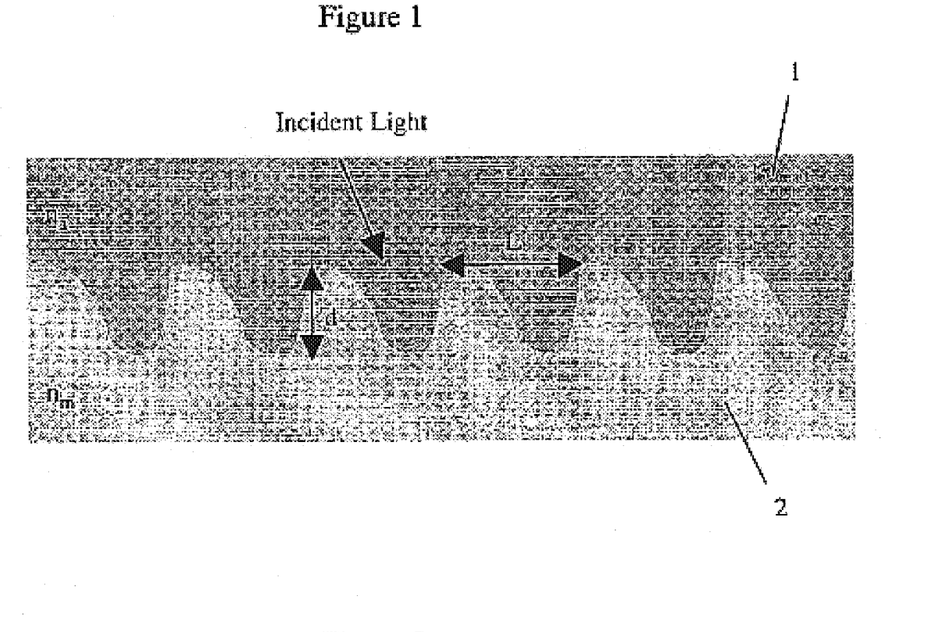
FIG. 1 illustrates a typical reflective diffraction grating of the type known in the art having two materials of refractive indices $n_a$ and $n_m$, that share a common periodic boundary.

In addition to the foregoing problems with metalized gratings, the metalization process itself is complicated, has many problems and is expensive to use. For example, consider FIG. 1 representing an idealized grating of the type known in the art and the case where a material 1 of refractive index $n_a$ is air and a material 2 of refractive index nm is some metal, such as gold or aluminum. The typical fabrication of such a grating involves creating a master grating from a suitable selected material such as glass, depositing a release layer on this master, applying the metallic coating to the release coated master, and bonding the metal to a substrate using an adhesive. Once the adhesive is cured, assuring adhesion of the grating form to the substrate, the master can be released and the metal remaining on the substrate acts as the grating surface (material 2) where light is incident from air (material 1). In a further example, consider the case where material 1 is not air but rather some dielectric such as glass or a polymer. In this case an adhesive layer must first be deposited on the grating surface to ensure that the metal deposited in a subsequent step remains attached to the surface of material 1.

In either of the foregoing cases, the required multi-step metalization process is made additionally complicated by the fact that the surface to be coated is not smooth, but can have very fine and possibly deep structures associated with the grating profile. The deposition processes must ensure that the coating is properly distributed over all surfaces regardless of the grating profile. This task that is very difficult for gratings of high aspect ratio, defined as the ratio of the structure depth to the structure width. Additionally, the adhesion of the metal is problematic when the complete grating undergoes rigorous environmental testing; for example, temperature cycling and/or aging at 85% relative humidity at 85° C.

M. S. D. Smith et al, "Diffraction gratings utilizing total internal reflection facets in Littrow configuration," *IEEE Photon. Tech. Lett.* Vol. 11, (1999), pages 84–86, proposed that for an immersed grating with one material being air and a second being a dielectric with index greater than that of air, if the grating profile is shaped such that incident light reflecting off any facet of the surface is reflected via total internal reflection ("TIR"), then high-efficiency diffraction can be attained without a metallic coating. However, the manufacturing process for such a grating requires precise control of the grating profile being made, and the process must be drastically changed each time one fabricates a grating with different functionalities and/or profile. In addition, it limits the allowable angles of incidence that can be used for the grating due to grating surface designs that can be actually, in practice, be fabricated. As a result, such grating has not become commercially available or widely used.

Consequently, in view of the foregoing problems it would be highly desirable to have a reflective diffraction grating that does not have a metalized reflective surface and does not require TIR from every facet of the grating surface.

SUMMARY OF THE INVENTION

The invention is directed to a metal-free reflective immersed diffraction grating for optical communications that is made of at least a first material 1 of refractive index $n_1$ and a second material 2 of refractive index $n_2$, wherein light from material 1 is incident on the grating; and the conditions of the following Expression (I)–(III) are met:

$n_1 > n_2$, $n_1 > \lambda/2L > n_2$ for single diffracted order at Littrow, and $n_2/n_1 < \sin \theta_j < 1$;

wherein $\lambda$ is the wavelength of the light incident on the grating, $\theta_j$ represents any and all propagation angles of incident and diffracted light and L is the grating period, and wherein said grating profile is located at the interface of material 1 and material 2. Material 1 can be a glass, a polymeric or copolymeric material, a crystalline structured or amorphous optical material, or a semiconductor such as silicon. Material 2 can be a glass, a polymeric or copolymeric material, a crystalline structured or amorphous optical material, a semiconductor such as silicon or a gas or vapor including air selected such that Expressions (I)–(III) are met.

In another embodiment of the invention, the grating profile is formed of additional materials 3 and 4, and the grating so formed is placed between materials 1 and 2 described above. Further, materials 3 and 4 can have any refractive index value provided they are not identical.

It is to be understood that both the foregoing general description and the following detailed description present embodiments of the invention, and are in tended to provide an overview or framework for understanding the nature and character of the invention as it is claimed.

DETAILED DESCRIPTION OF THE INVENTION

With regard to all Figures appended to this application and all discussions herein, $n_1$ always represents the refractive index of the material from which light is incident upon the grating, regardless of the composition of the material. Further, as used herein a material of index $n_1, n_2, n_3, \ldots$ et cetera, is always associated with a material 1, 2, 3, . . . et cetera, respectively, although such materials are not necessarily the same in each embodiment or Figure discussed or illustrated herein. While the Figures illustrate a "flat" grating, the principles described herein may be applied to a grating of any shape; for example, a concave grating such as one described by K. M. Baker, "Highly corrected submicrometer grid patterning on curved surfaces," Appl Opt, vol. 38, pp. 339–351, 1999; or to a grating having a different shape, for example, one that is curved, convex or other shape known in the art.

The diffraction grating(s) described herein in accordance with the invention is a total internal reflection ("TIR") grating that allows for the fabrication of immersed gratings without the use of a metallic coating or a grating surface made of a metallic substance. Further, the TIR grating of the invention has no restrictions on the grating profile. The profile can be saw-toothed, a waveform, square or rectangular shaped, or other shape known or contemplated in the art. The first condition for such a grating to exist is [Expression (I)]

$$n_1 > n_2 \qquad (I)$$

where the light incident on the grating is from material 1.

High efficiency can be achieved for a single diffracted order under the Littrow configuration, where the diffracted light re-traces the same path as the incident light, For this case, the grating period must satisfy the inequality [Expression (II)]

$$n_1 > \frac{\lambda}{2L} > n_2 \qquad (II)$$

where $\lambda$ is the wavelength of the incident light and L is the grating period. Under more general conditions of the TIR grating, the grating period must be chosen such that the incident and diffracted angles satisfy [Expression (III)]

$$\frac{n_2}{n_1} < \sin|\theta_j| < 1 \qquad (III)$$

where $\theta_j$ represents any and all of the propagation angles ($0^{th}$ through $+/-j^{th}$) of the incident or diffracted light in material 1.

The conditions set by in Expressions (I)–(III) limit the diffractive behavior of the grating such that a diffracted wavelength order into material 2 simply cannot exist. If the incident and diffracted angles are examined properly, the conditions above are equivalent to choosing the grating period such that all incident and diffracted light satisfies TIR conditions at the interface between the two materials.

In general, many conventional (i.e., metal-coated), high-diffraction efficiency (90–95%) grating designs have been demonstrated using various grating profiles [see M. G. Moharam et al., "Diffraction Analysis of dielectric surface relied gratings," *J. Opt. Soc. Am.*, Vol. 72 (1982), pages 1385–1392: K. Yokomori, "Dielectric surface-relief gratings with high diffraction efficiency," *Appl. Opt.*, Vol. 23 (1984) pages 2303–2310; and M. G. Moharam et al, "Diffraction characteristics of photoresist surfaces-relief gratings," *Appl. Opt.*, Vol. 23 (1984), pages 3214–3220.], and a method exists for calculating the equivalence of structures to accommodate these differences [M. Breinde et al., "Equivalence of ruled, holographic, and lamellar gratings in constant deviation mountings," *Appl. Opt.*, Vol. 19 (1980), pages 1812–1820]. For TIR gratings, the conditions of Expressions (I)–(III) that define the TIR grating are valid regardless of the grating profile. Thus, any grating profile (that is, the individual "teeth" of the grating) can be used, for example, sinusoidal, binary, trapezoidal, blazed or other designs known in the art, and such grating is classified as a TIR grating provided Expressions (I)–(III) are satisfied.

Figure 3:
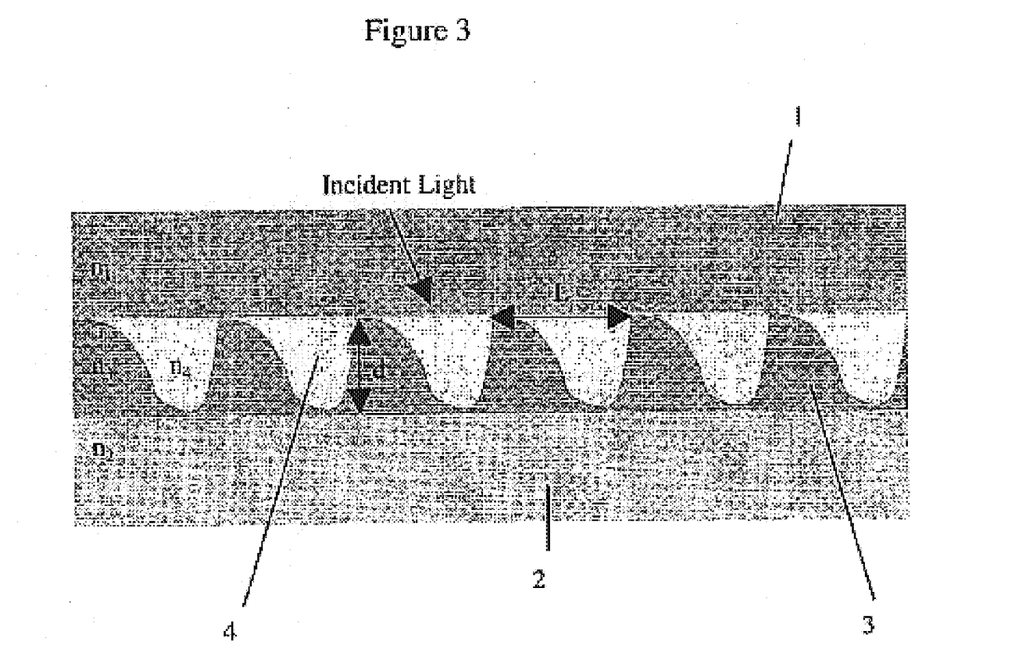
FIG. 3 illustrates an arbitrary reflective diffraction grating in accordance with the invention in which $n_1$ and $n_2$ are the refractive indices of the media that share the common periodic boundary comprised of materials of refractive indices $n_3$ and $n_4$.

FIG. 3 represent a diffraction grating of arbitrary design in accordance with the invention. In FIG. 3 the materials 1 and 2 have refractive indices $n_1$ and $n_2$, respectively. The materials 1 and 2 share the common periodic boundary which generally consists of materials designated in FIG. 3 as materials 3 and 4, which materials have refractive indices $n_3$ and $n_4$, respectively. Referring now to FIG. 3, while in general the material 2 with refractive index $n_2$ can be chosen to be any dielectric material such that Expression (I) is satisfied, the true value of an immersed grating is realized if material 2 is chosen to be air, with refractive index of unity ($n_2=1$). There are several advantages for such a choice. First, the limits set by Expressions (I)–(III) are given the largest range by having $n_2=1$. Second, and perhaps more importantly, the grating structure itself can be made of but a single material with refractive index $n_1$. No metallic coating needs to be applied, which simplifies the fabrication process significantly and subsequently reduces the cost of fabricating the grating.

FIG. 3 should be viewed as a nominal working structure where materials 1 and 2 are optically thick materials and additional materials are inserted between materials 1 and 2 to form the grating region and any additional homogeneous (e.g., non-structured) layers. In FIG. 3 we represent the grating region as being composed of materials 3 and 4, but this invention is not limited to the addition of only two materials or only materials that are forming a grating. One or more of the inserted materials can be nonstructured. The TIR aspect of this invention remains unchanged with the addition of materials in between materials 1 and 2 provided that Expressions (I)–(III) are satisfied. As an example, one skilled in the art may design and fabricate a structure that hasp thin films coated onto a substrate of material 1. A grating is then etched into the top k layers of the film stack ($0<k<p$) or a grating structure is replicated using a polymer onto the top film layer and the grating is in air (material 2). Provided Expressions (I)–(III) are satisfied, such a structure would also be a TIR grating. In another example of a TIR grating, one can make a grating with materials 1 and 2 [satisfying Expressions (I)–(III)], and additional materials 3 through q, with materials 3 through q being inserted between materials 1 and 2, and q is an integer. The metal-free grating profile can thus be formed from two or more of the additional materials 3 through k having indices of refraction $n_3$ through $n_k$, or from materials 1 and one or more of materials 3 through q, or from materials 2 and one or more of materials 3 through q. Thus a TIR grating can be constructed with any number of materials inserted as layers between materials 1 and 2.

In a similar vein, one skilled in the art will realize that it is not necessary for the periodic layer, defined in FIG. 3 with materials 3 and 4, to be made strictly of a series of discrete optical materials. There can be any number of materials in this grating layer laid out in any geometry, provided the structure is periodic. One extreme embodiment of this case is the use of a volume phase material such as a photopolymer or dichromated gelatin. In this case, the grating region does not have an index of refraction profile that changes discretely at a material interface, but rather is a region of continuously changing optical properties, as long as the changes occur in a periodic fashion such that a grating is formed.

With regard to materials 3 and 4 which form the grating structure, the preferred method for forming the structure is to etch, replicate or otherwise process one of materials 3 and 4 to form the periodic grating structure. The other material can then be applied on top of the patterned first material such that grating region is formed.

Figure 2:
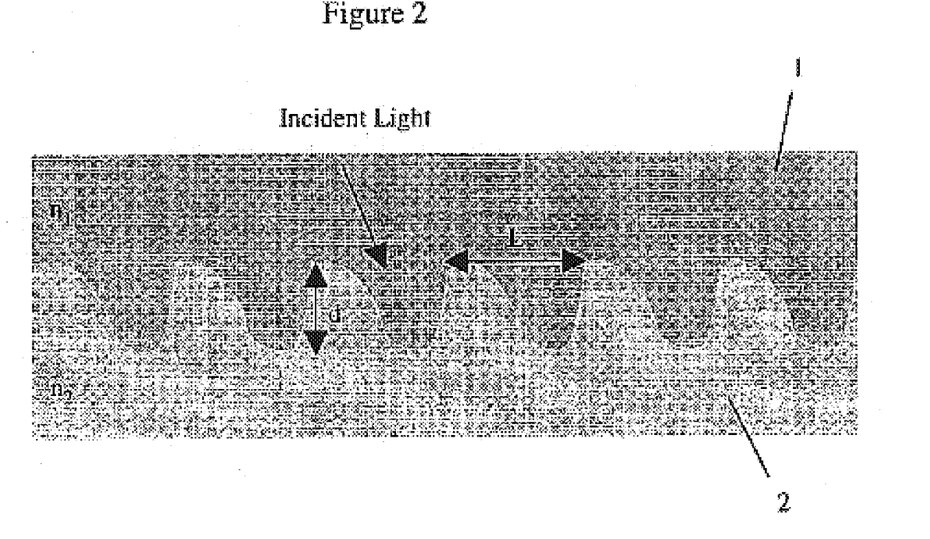
FIG. 2 illustrates an arbitrary reflective diffraction grating in accordance with the invention having two materials of refractive indices $n_1$ and $n_2$ th at share a common periodic boundary.

Finally, a TIR grating can be made regardless of the physical materials that comprise the periodic layer (materials 3 and 4), since the TIR properties are governed by the incident and transmitted media, materials 1 and 2. Thus, the grating depicted in FIG. 3 describes a TIR grating regardless of the materials chosen for materials 3 and 4, provided Expressions (I)–(III) are satisfied. The only requirement regarding materials 3 and 4 is that $n_3 \neq n_4$. Using these parameters, one can create different gratings. For example, if $n_4=n_1$ and $n_3=n_2$, then the grating of FIG. 3 becomes identical to that of FIG. 2. One can also create a grating wherein $n_2$ and $n_3$ equal 1, and the materials 2 and 3 are air; material 4 from which the grating pattern is made is either the same or different from material 1.

The metal-free grating of the invention can be made of any nonmetallic material provided that Expressions (I)–(III) are satisfied. Examples of such materials are any glasses, ceramics, semiconductors, and any polymeric materials of differing composition and refractive index that are known or will be known in the art as suitable for use in optical communication systems.

Glasses of varying composition can also be used to fabricate TIR gratings in accordance with the invention. Generally, any glass known to be suitable for the manufacturing of optical devices, waveguides and/or optical fibers can be used provided that the Expression (I)–(III) are fulfilled. Such glass materials can be used alone or a mixture of glasses and polymeric materials can be used. For example, a grating can be made wherein material 1 is a glass, material 4 is a polymer and materials 2 and 3 are air. Other combinations in the grating are also possible, including glass, ceramic, crystalline and semiconductor materials used wholly or in combination, with or without the use of air as one material.

In addition to glasses, examples, without limitation, of polymeric materials, including copolymeric materials, that can be used in making the grating of the invention are acrylates, methacrylates, polyesters, polyimides, thiol-yne polymers, thiol-yne polymers, polyphenylene oxide polymers, polyphenylene sulfide polymers, polyurethanes, polyamides and other polymers, and copolymers, known to be useful for the preparation of optical elements and devices suitable for use in optical communication systems. While materials containing O—H and N—H bonds can be used in practicing the invention, it is preferable that such materials not be used due to the absorbance losses suffered through use of such materials. The foregoing materials can contain aromatic rings and alkyl groups, and combinations thereof. In addition, the materials include halogenated derivatives of all of the foregoing, particularly chlorinated, fluorinated and mixed chlorinated/fluorinated derivatives. All of the foregoing can also contain sulfur in a ring system, or as a linking group between aromatic groups, alkyl groups or alkyl and aromatic groups whether or not such groups contain additional sulfur atoms and/or halogen atoms such as fluorine or chlorine. Examples, without limitation, of polymeric materials that can be used in practicing the invention can be found in U.S. Pat. Nos. 6,306,536, 4,536,016, and many additional foreign and domestic patents and patent application publications.

Figure 4:
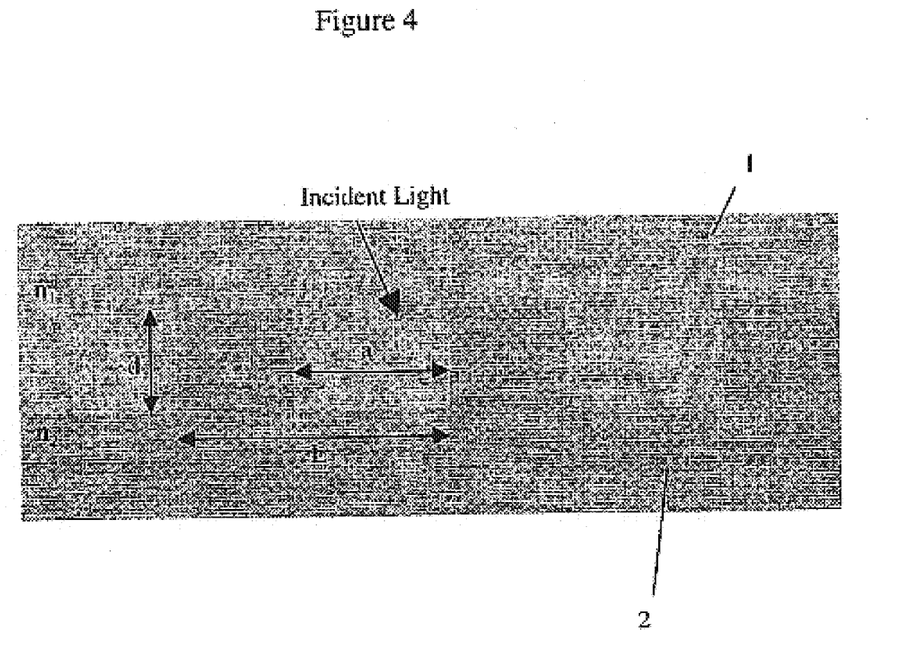
FIG. 4 illustrates a binary diffraction grating in accordance with the invention where the diffraction pattern is rectangular.

FIG. 4 illustrates a second embodiment of the invention; in this case a TIR grating that is also a low-PDL (Polarization-Dependent Loss) grating. The low-PDL grating is a high dispersion, high-efficiency, immersed diffraction grating whose performance has very little dependence on the polarization of the incident light. In accordance with the invention, the fabrication of the low-PDL grating as a TIR grating can be done without the use of a metallic coating or surface, and without restriction as to the grating profile. (In gratings of the prior art, a metallic layer would be the material having refractive index $n_2$. In such prior art gratings, the material of index $n_1$ is frequently air.) As is the case with the generalized example of the invention discussed above in conjunction with FIG. 3, in this instance the conditions for the existence of a low-PDL TIR grating limit the diffraction behavior of the grating such that a diffraction order into material 2 of refractive index $n_2$ cannot exist. If the incident light and the diffracted light angles are examined properly, the conditions selected are equivalent to choosing the grating period such that all incident and diffracted light satisfy the TIR conditions at the interface between the two materials. That is, Expressions (I)–(III) must be satisfied.

For a TIR, low-PDL grating of the invention, the insertion loss ("IL") of the grating, in terms of decibels ("dB"), is defined by its spectral response in both the transverse electric ("TE") and transverse magnetic ("TM") polarization states. These insertion loses are defined by Equations (1) and (2), $$IL_{TM} = -10 \log \eta_{TM} \quad (1)$$

$$IL_{TE} = -10 \log \eta_{TE} \quad (2)$$

where $\eta_{TE}$ and $\eta_{TM}$ are the absolute diffraction efficiencies of the TE and TM polarizations, respectively. The TE polarization is defined as the polarization whose electric field is oriented along the direction of the grating grooves and the TM polarization is defined as that whose electric field is perpendicular to the TE polarization. (See FIG. 3.)

The performance of the low-PDL grating is defined by means of Equations (3) and (4):

$$PDL = |IL_{TM} - IL_{TE}| \quad (3)$$

$$IL_{SUM} = IL_{TE} + IL_{TM} \quad (4)$$

both of which are also expressed in decibels.

The design specifications of an exemplary low-PDL grating are given in the Table 1.

TABLE 1

Design specifications for a low-PDL grating

| Quantity | Minimum Value | Maximum Value |
|---|---|---|
| $n_1$ | 1.4 | 1.6 |
| $n_2$ | 1 | 1.1 |
| L | 625 nm (1600 l/mm) | 780 nm (1280 l/mm) |
| d | 550 nm | 750 nm |
| a/L | 0.30 | 0.60 |

The symbols are defined in FIG. 4.

The nominal grating profile described in Table 1 is binary. However, as previously stated, other grating profiles such as sinusoidal, triangular, etc., can exhibit the desired low IL and PDL performance. This flexibility in terms of the grating profile shape allows for relatively loose manufacturing tolerances once a specific profile is chosen (typically for fabrication reasons). For example, the binary profile that was discussed can deviate significantly in form without seriously degrading the performance of the device. The side wall may slope from −20 to +10 degrees; the mesas and valleys of the grating can accept significant rounding, on the order of 15% in depth, etc.

Based on the design specifications given in Table 1, the operational performance of the invented low-PDL gratings is summarized in Table 2.

TABLE 2

Exemplary operational performance of a low-PDL grating

| Quantity | Minimum Value | Maximum Value |
|---|---|---|
| operating wavelength | 1560 nm | 1610 nm |
| angle of incidence | $\theta_L$ − 10 degrees | $\theta_L$ + 10 degrees |
| PDL | 0 dB | 0.5 dB |
| $IL_{sum}$ | 0 dB | 1.4 dB |

PLD and $IL_{sum}$ values are performance specifications across the entire wavelength band indicated in the Table. $\theta_L$ is the Littrow angle, defined by $2n_1 L \sin(\theta_L) = \lambda$, where $\lambda$ is the wavelength of the incident light. The other symbols are defined in Equations (1)–(4) and the specification.

Figure 5:
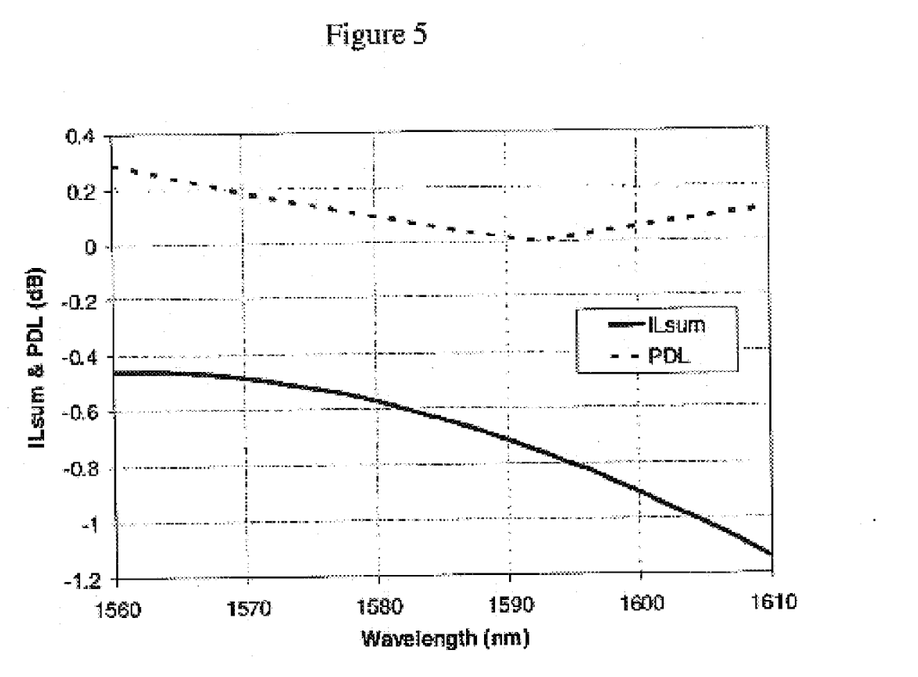
FIG. 5 illustrates the performance of a low-PDL (low polarization-dependent loss) grating of the invention.

As an exemplary demonstration of the performance of the above design, the chosen parametric values $n_1=1.444$, $n_2=1$, L=714 nm, d=640 nm, and a/L=0.45 for the parameters that define the grating. For an incident angle of 48.6 degrees in material 1, the performance of this grating is shown in FIG. 5. The kink in the PDL curve is due to the absolute value function in the definition of PDL [see Equation (3)]. FIG. 5 demonstrates that the performance specifications given in Table 1 have in fact been met.

Figure 6:
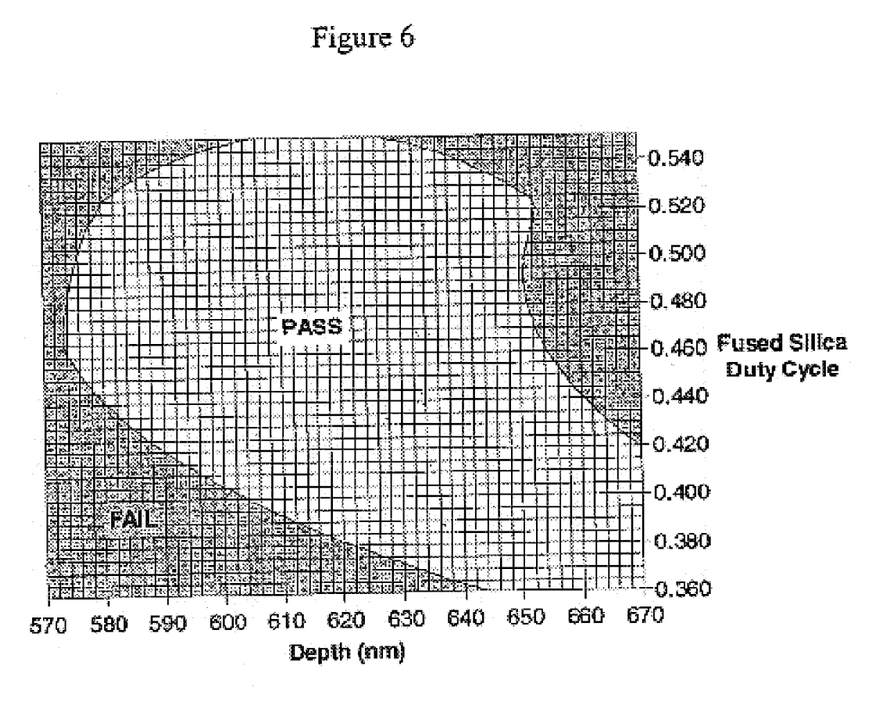
FIG. 6 illustrates a merit function (pass if PDL<0.5 and $IL_{TE}+IL_{TM}<1.4$) as a function of grating depth and duty cycle, for a grating having the form illustrated in FIG. 4.

Using the performance specifications given of Table 1, a merit function can be generated such that the grating is given the status of "pass" if the PDL and $IL_{sum}$ specifications are met over the entire wavelength band, and "fail" otherwise. FIG. 6 shows such a plot of this merit function as a function of depth and duty cycle. For FIG. 6, the parameters for the low-PDL grating are $n_1=1.444$ (fused silica), $n_2=1$ (air), L=714 nm, d=640 nm, and a/L=0.45. The light is incident from the material 1 (whose refractive index is $n_1$) at angle of 48.6° with respect to the normal. PDL and $IL_{SUM}$ are defined in Equations (3) and (4). The white and gray zones correspond to the grating depth and duty cycle combinations that pass or fail, respectively, the performance specifications given in Table 2. The parameters are thus identical to those used in FIG. 5. Given the large "pass" range shown in FIG. 6, it is clear that this low-PDL grating invention is a very robust design. Consequently, this robustness translates directly to loose manufacturing tolerances for any single design.

Figure 7:
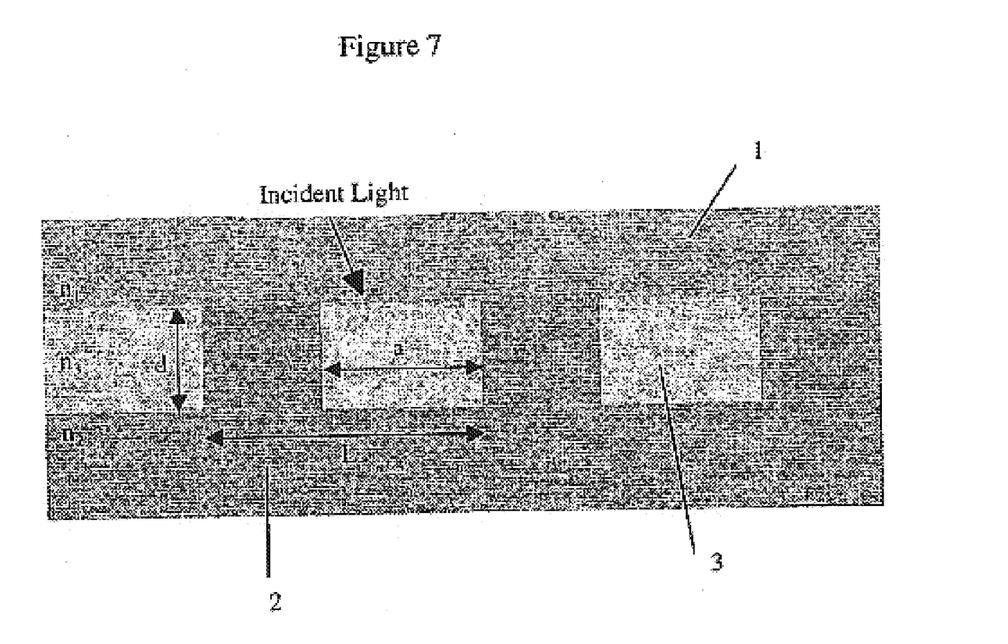
FIG. 7 illustrates a further embodiment immersed diffraction grating of the invention whose performance has little dependence on the polarization of the incident light.

Another embodiment of the invention is illustrated in FIG. 7, where material 1 is simply a substrate, and the grating is formed from a material 3 of index $n_3$, in conjunction with material 2 of index $n_2$. This could occur, for example, if the grating were fabricated by etching the periodic structure into a film (material 3) which was previously deposited onto the substrate (material 1), or by replicating a polymeric periodic structure onto material 1 using a previously patterned master. The foregoing data clearly indicates that the TIR, low-PDL grating in accordance with the invention is a novel high-dispersion diffraction grating that can be used in the telecommunications L-band, and that the grating has high efficiency for all polarization states. The fabrication of such a grating does not require deposition, and has a broad fabrication tolerance range to meet the target specifications.

In yet another embodiment of the invention, a non-metallic material with large refractive index, such as silicon (Si), can be used to make a high-efficiency grating as part of a Grism (grating-prism) assembly. Grism assemblies are used as part various wavelength management products for dense wavelength-division (DWDM) telecommunications systems. Examples are the Dynamic Spectrum Equalizers ("DSE") and Multi-Wavelength Selectable Switches ("MWSS") manufactured by Corning Incorporated. Both of these devices are grism assemblies to map optical wavelength to propagation angle. A Grism assembly consists of a grating on the face of a prism, the combination of which can achieve very high dispersion of wavelength into angle. Current Grisms are made in fused silica, due to the availability of the material, ease of use, and its desirable optical properties.

Future systems are likely to require greater dispersion for denser DWDM systems. One way to achieve this is to make the Grism assembly out of silicon instead of fused silica. Provided nothing else changes, the final dispersion out of the prism will be enhanced by the ratio of the indices of refraction of silicon and fused silica, roughly a factor of 2.4.

Figure 8:
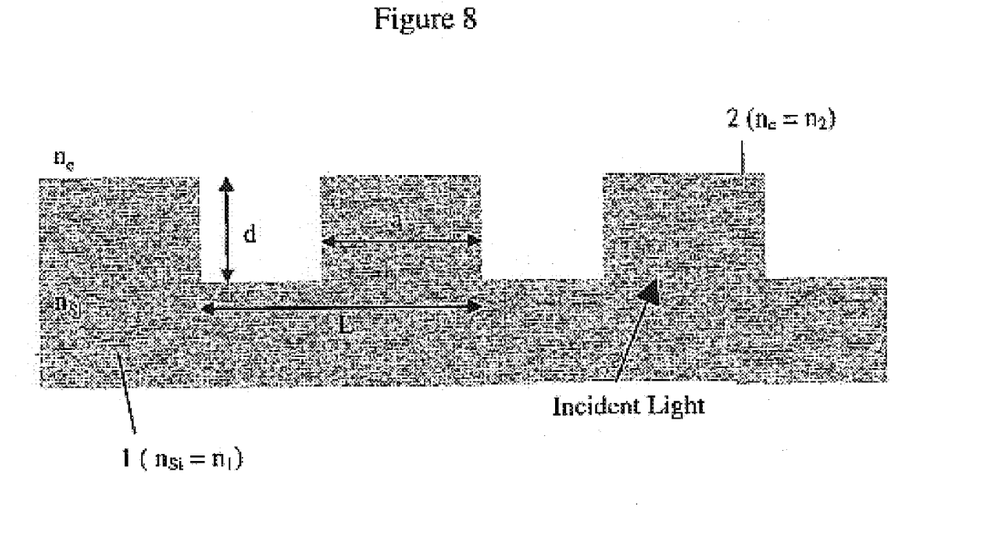
FIG. 8 illustrates a silicon binary grating in accordance with the invention.

In accordance with the invention, a further embodiment thereof is an etched silicon grating with the dispersive properties required for the next generation of DSE and MWSS products. FIG. 8 is a schematic representation of a grating device in which the grating period is L, the duty cycle is a/L, the grating depth is d, the refractive index of silicon is $n_{Si}$, and the refractive index of the coating is $n_c$. Light is incident from within the silicon. Expressions (I)–(III) must still be satisfied, which they are when the light incident on the grating profile passes through the silicon. Referring back to Expressions (I)–(III), in this type of embodiment $n_{Si}$ is $n_1$ (for Si equaling material 1), and $n_c$ is $n_2$ (for the coating equaling material 2). The coating can be air or any non-metallic material.

For the grating to operate in first order, the silicon grating must have approximately 2–4 times the number of lines per mm as the current fused silica grating. This translates to a maximum grating period of 317.6 nm. In the example herein, the grating was chosen to have a period of 300 nm and a duty cycle of 50% in order to optimize the trade off between enhanced dispersion and ease of fabrication. The peak of the diffraction efficiency occurs at the Littrow angle, where the output angle of the diffracted light exactly overlaps the input light. The relation to other grating parameters is formally given by Equation (5)

$$2n_{Si}L \sin(\theta_L)=m\lambda \quad (5)$$

where $\theta_L$ is the Littrow angle, m is the diffracted order, and $\lambda$ is the optical wavelength. For our designs, we choose m=1 to maximize diffraction efficiency, and a center wavelength of 1550 nm.

If one used the selected parameters and a metallic coating, the result is a peak diffraction efficiency that is less than 90%, which is undesirable from the point of view of insertion loss. While a metallic coating such as a gold coating might be able to generate a diffraction efficiency of 93% for a fused silica Grism, the larger refractive index of silicon degrades the reflective properties of the metallic coatings.

For the invention herein, using Expression (II) and equation (5) gives a maximum coating index of $n_c=m\lambda/2L=2.58$. Calculations using rigorous coupled-wave analysis show that this condition indeed produces diffraction efficiencies greater than 98% over this entire range, and greater than 99.5% for $n_c<2.4$. [See M. G. Moharam and T. K. Gaylord, "Diffraction analysis of dielectric surface-relief gratings," *J. Opt. Soc. Am.*, Vol. 72, (1982) pp. 1285–1392 for an explanation of rigorous coupled-wave analysis] While there are many materials one can choose from within this index range, it would be easier and far more cost effective not to use any coatings at all. Using $n_c=1$ for air, 99.8% peak efficiency is obtained at the Littrow angle.

Figure 9:
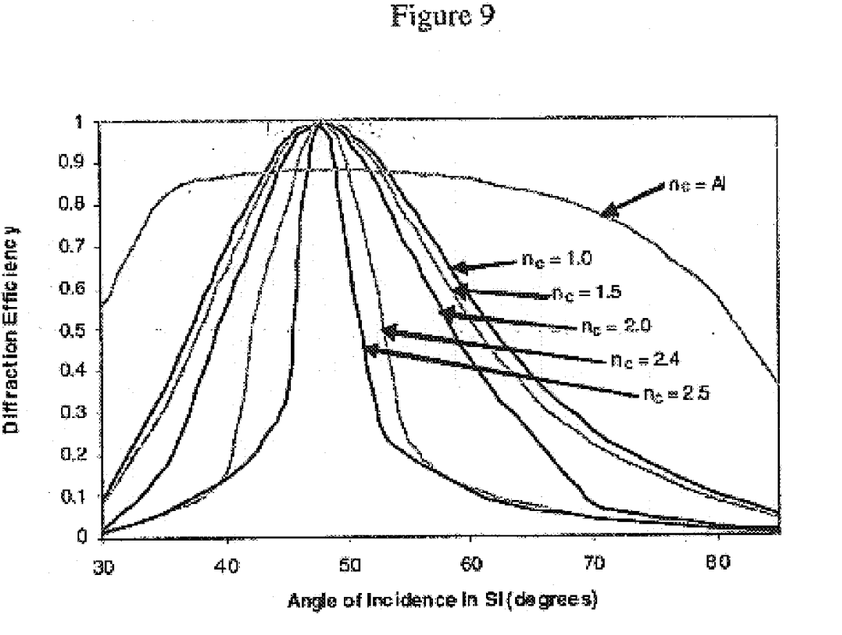
FIG. 9 illustrates the diffraction efficiency of a silicon grating as a function of the angle of the light incident on the grating for various cover layers.

Of course one typically cannot use the grating exactly at Littrow, since that would generally result in a significant power loss (insertion loss) when trying to separate the output beam from the input beam path. FIG. 9 shows the dependence of the diffraction efficiency on the angle of incident light with respect to the grating normal. For this data, the grating depth is optimized to provide the maximum diffraction efficiency at the angle of incidence chosen. The calculations show that the smaller the coating index, the larger the available design range for the angle of incidence on the grating. This works to the advantage of our "air-coated" design, since the input and output beams can be separated by greater than 8.5 degrees while still providing diffraction efficiencies over 90%.

Figure 10:
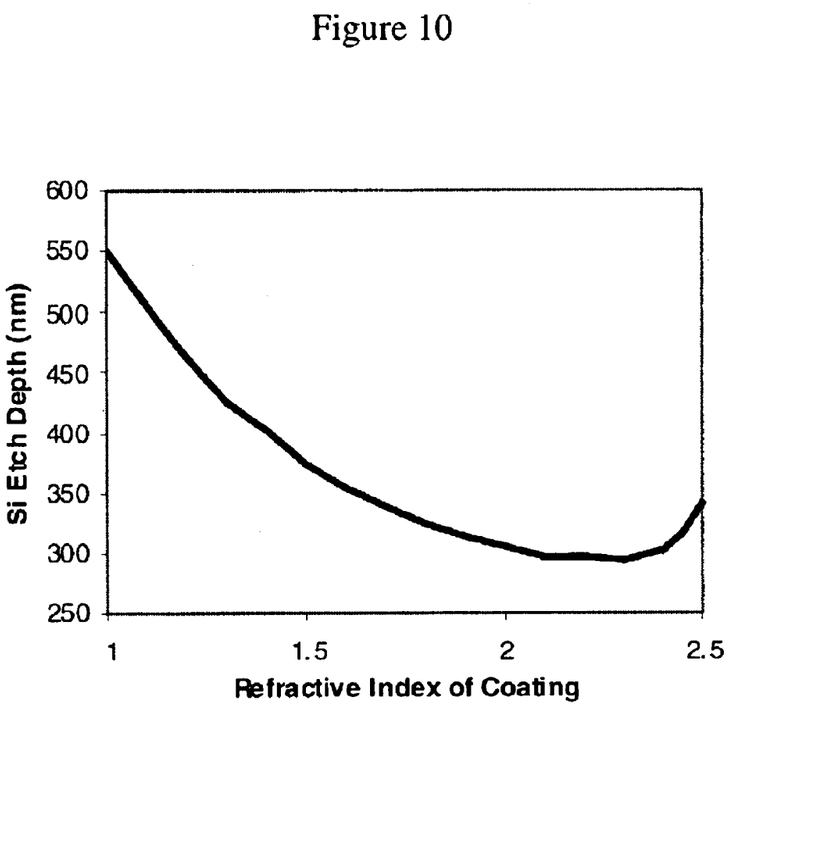
FIG. 10 illustrates the depth to which the silicon must be etched as a function of the refractive index of the coating ($n_c$).

Using $n_c=1$ has the advantages of eased product manufacture (no coating) and the widest range of design angles. The disadvantage would appear to be in terms of fabricating the grating lines. FIG. 10 shows the required etch depth required for maximum diffraction efficiency as a function of refractive index of the coating. For $n_c=1$, the grating must be etched 551 nm deep, which implies an aspect ratio of 3.67:1. One method of etching such a structure is through anisotropic Cl-based reactive ion etching. However, another method is through anisotropic wet etching of a 110-oriented silicon substrate, provided the crystallographic planes are parallel to the desired sidewall of the grating lines. In fact, etching this type of substrate has been shown to produce aspect ratios of 650:1 or greater. [See K. E. Bean, "Anisotropic etching of silicon," *IEEE Trans. on Electron Devices*, Vol. 25 (1978), pages 1185–1193.] The major precaution one must take in making a silicon Grism grating according to the invention is to accurately orient the etch mask with the 110 plane on the substrate.

Using the foregoing description, a silicon grating was designed that can be used as part of a silicon Grism assembly for future generation DSE, MWSS, and other wavelength-selective devices. The grating parameters are listed in Table 3.

TABLE 3

| | |
|---|---|
| Incident material | 110 Silicon |
| Coating material | None (Air) |
| Grating pitch | 330 nm |
| Duty cycle | 50% |
| Grating depth range in >90% bandwidth | 530–551 nm |
| Angular separation design bandwidth for >90% efficiency | 8.5 degrees |
| Diffraction efficiency | 90–99.8% |

Figure 11:
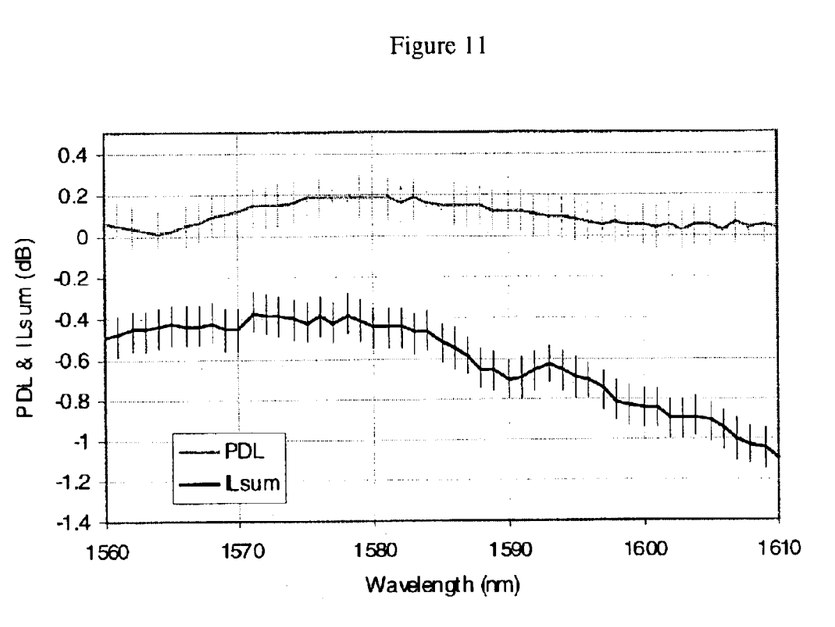
FIG. 11 illustrates the performance of a particular grating made in accordance with the invention.

A particular example of said TIR grating was fabricated to demonstrate this new invention. The grating was made from fused silica (materials 1 and 4) and air (materials 2 and 3) with a period of L=714 nm. The grating depth and duty cycle (a/L) were approximately 635 nm and 0.45, respectively. The performance of this grating is shown in FIG. 11, where the light is incident on the grating from within the fused silica at an angle of 48.6 degrees with respect to the surface normal of the grating. The quantities PDL and IL sum are defined in Equations (1)–(4). This particular embodiment of the invention demonstrates the high efficiency achievable for both polarizations.

It will be apparent to those skilled in the art that various modifications and variations can be made to the present invention without departing from the spirit or scope of the invention. Thus, it is intended that the present invention covers the modifications and variations of this invention provided they come within the scope of the appended claims and their equivalents.

We claim:

1. A metal-free reflective immersed diffraction grating for optical communications, said grating comprising:

at least a first material 1 of refractive index $n_1$ and a second material 2 of refractive index $n_2$, wherein light from material 1 is incident on the grating; and the conditions of the following Expression (I)–(III) are met:

$$n_1 > n_2, \tag{I}$$

$$n_1 > \lambda/2L > n_2 \text{ for single diffracted order at Littrow, and} \tag{II}$$

$$n_2/n_1 < |\sin\theta_j| < 1; \text{ and} \tag{III}$$

wherein $\lambda$ is the wavelength of the light incident on the grating, $\theta_j$ represents any and all propagation angles of incident and diffracted light, and L is the grating period, and wherein said grating profile is located at the interface of material 1 and material 2.

2. The metal-free grating according to claim 1, wherein said grating profile is formed from material 1 and material 2 at an end of material 1.

3. The metal-free grating according to claim 1, wherein said grating profile is formed from additional materials 3 and 4 having refractive indices $n_3$ and $n_4$, said materials 3 and 4 being located between said materials 1 and 2; said material 3 being adjacent to material 1, said material 4 being adjacent to material 2, and the refractive index of material 3 does not equal the refractive index of material 4.

4. The metal-free grating according to claim 3, wherein materials 3 and 4 are selected from the group comprising:

(a) a glass or ceramic of any composition known in the art to be suitable for use in optical communications applications, and (b) a polymer or copolymer of any composition known in the art to be suitable for use in optical communications;

(c) a semiconductor material such as silicon;

(d) a crystalline structured or amorphous optical material.

5. The metal-free grating according to claim 1, wherein said material 1 is selected from the group comprising (a) a glass or ceramic;

(b) a polymer or copolymer; and (c) a semiconductor material such as silicon; and, (d) a crystalline structured or amorphous optical material.

6. The metal-free grating according to claim 1, wherein said material 2 is selected from the group comprising (a) a glass or ceramic of any composition known in the art to be suitable for use in optical communications applications;

(b) a polymer or copolymer of any composition known in the art to be suitable for use in optical communications; and (c) a gas or vapor such as air; and (d) a semiconductor material such as silicon; and (e) a crystalline structured or amorphous optical material.

7. The grating according to claim 1, wherein the shape of the grating is flat, curved, concave, convex or other known in the art.

8. The grating according to claim 1, wherein the grating profile is sinusoidal, binary, trapezoidal, blazed or other design known in the art.

9. The metal-free grating according to claim 1, wherein said grating is formed from materials 1 and 2, and from one or a plurality of additional materials 3 through k having indices of refraction $n_3$ through $n_k$, said materials 3 through k being located between said materials 1 and 2.

10. A metal-free reflective immersed diffraction grating for optical communications, said grating comprising:

a first material 1 which is silicon whose refractive index is $n_{Si}$ and a second material 2 of refractive index $n_2$, wherein light from material 1 is incident on the grating; and the conditions of the following Expression (I)–(III) are met:

$$n_{Si} > n_2, \tag{I}$$

$$n_{Si} > |m|\lambda/2L > n_2 \text{ for single diffracted order at Littrow, and} \tag{II}$$

$$n_2/n_{Si} > |\sin\theta_j| > 1; \text{ and} \tag{III}$$

wherein $\lambda$ is the wavelength of the light incident on the grating, $\theta_j$ represents any and all propagation angles of incident and diffracted light, and L is the grating period, and wherein said grating profile is located at the interface of material 1 and to material 2.

11. The grating according to claim 10, wherein material 2 is selected from the group consisting of a glass or ceramic, any polymer or copolymer, a semiconductor material, a crystalline or amorphous optical material, and a gas or vapor such as air.

12. The grating according to claim 10, wherein material 2 is air.

13. A metal-free reflective immersed diffraction grating for optical communications, said grating comprising:

at least a first material 1 of refractive index $n_1$ and a second material 2 of refractive index $n_2$, wherein light from material 1 is incident on the grating; and the conditions of the following Expression (I)–(III) are met:

wherein $\lambda$ is the wavelength of the light incident on the grating, $\theta_j$ represents any and all propagation angles of incident and diffracted light, and L is the grating period, and wherein said grating profile is located at the interface of material 1 and material 2 wherein said grating profile is designed such that the grating exhibits low insertion loss (IL) and low polarization-dependent loss (PDL).

14. The metal-free grating, according to claim 13, wherein the grating exhibits $IL_{sum} < 1.4$ dB and PDL $< 0.5$ dB.

* * * * *

UNITED STATES PATENT AND TRADEMARK OFFICE
CERTIFICATE OF CORRECTION

PATENT NO. : 6,813,080 B2
DATED : November 2, 2004
INVENTOR(S) : John R. Marciante et al.

It is certified that error appears in the above-identified patent and that said Letters Patent is hereby corrected as shown below:

Column 12,
Line 22, currently reads "$n_2/n_{Si} >$ Sin $|\theta_j| > 1$; and" should read
-- $n_2/n_{Si} <$ Sin $|\theta_j| < 1$; and --.
Line 45, insert:
-- (I) $n_1 > n_2$,
  (II) $n_1 > \lambda/2L > n_2$ for single diffracted order at Littrow, and
  (III) $n_2/n_1 <$ Sin $|\theta_j| < 1$; and --.

Signed and Sealed this

Twenty-third Day of August, 2005

JON W. DUDAS
*Director of the United States Patent and Trademark Office*